March 14, 1972   J. O. McLEAN   3,649,532
METHOD OF TREATING WATER
Filed July 20, 1970
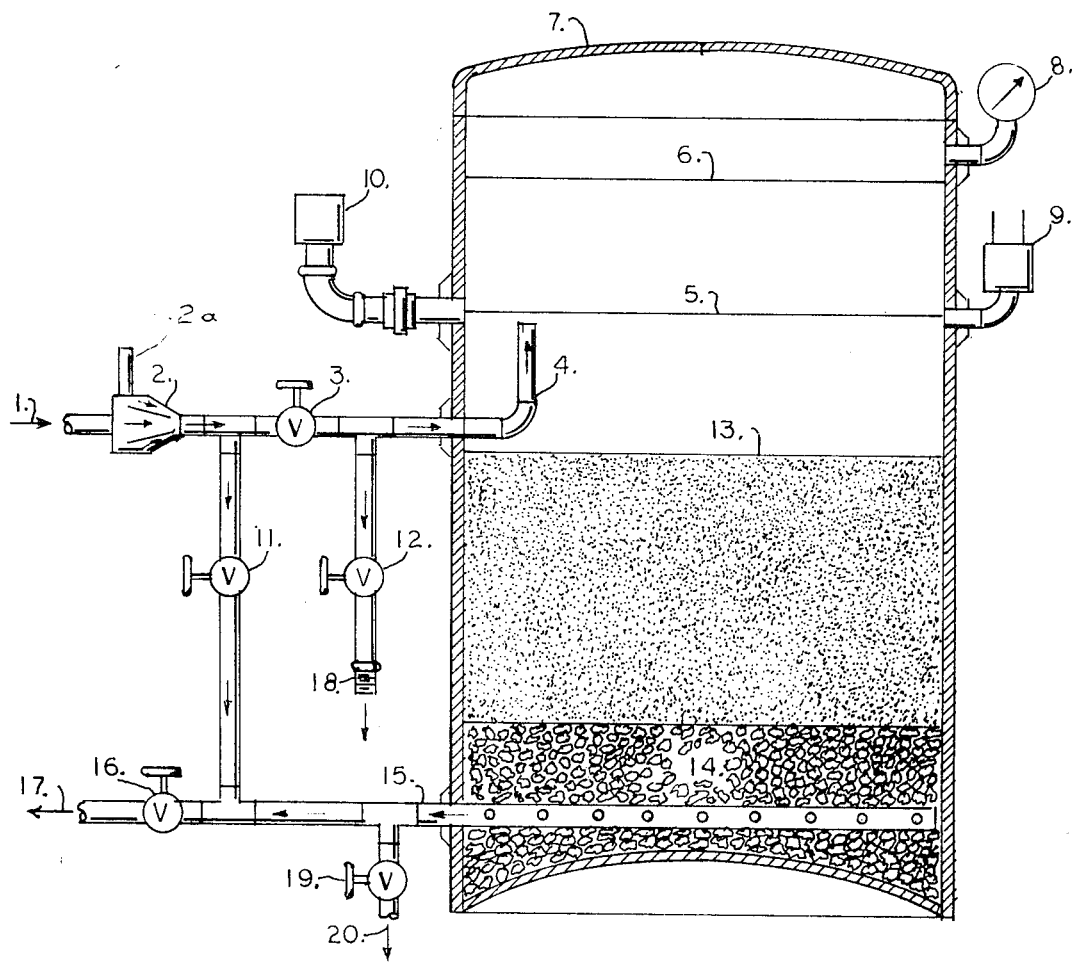
INVENTOR
J.O. McLEAN
BY
William King ATTORNEYS

United States Patent Office 3,649,532
Patented Mar. 14, 1972

3,649,532
METHOD OF TREATING WATER
John Oliver McLean, Varina, Va.
(Box 288A, Rte. 14, Richmond, Va. 23702)
Filed July 20, 1970, Ser. No. 56,294
Int. Cl. C02b 1/28
U.S. Cl. 210—48
8 Claims

ABSTRACT OF THE DISCLOSURE

A compact, one tank system is provided for treating water from wells comprising aerating, storing, neutralizing, oxidizing and filtering in a single, relatively simple mechanical, inexpensive setup.

BACKGROUND AND SUMMARY

This invention relates to a novel system for treating well and other household or domestic water supplies. Many wells contain much natural acidity, soluble and insoluble iron, silt and other particulate matter, and sulfur odors.

The principal object of the present invention is to provide a system in which all of the above mentioned problems are eliminated even though the apparatus involved requires only a single tank, relatively little space and a minimum of maintenance. The primary function of the treating process hereof is to remove natural acidity, leaving the water with a pH of 7.0–7.5. Even after extended periods during which the water is in the system, the pH never goes above 7.5. In particular the acidity makes the water aggressive, and creates a "blue-drip" condition caused by acid attack of copper pipes which form blue copper salts having undesirable coloring effects on bathtubs, sinks, etc. The process simultaneously oxidizes and removes soluble iron, normally the most objectionable ingredient in any local well supply for household use, present as ferrous bicarbonate. It also removes insoluble iron, silt and other particulate matter. Sulfur odors are effectively removed also, and the effluent is crystal clear, odorless and has a delightful taste.

Several methods of removing iron from water have been previously known. All of these processes have disadvantages and some are potentially dangerous for home use.

A common method in the trade utilizes three tanks:

(1) A pressure tank, with which most homes with well water are already equipped.

(2) A neutralizer tank, designed to raise the pH of the water.

(3) An iron oxidizing tank containing manganese zeolite to remove iron.

This system usually produces satisfactory water, but for the average household, it is very expensive, requires frequent attention, large volumes of water for backwashing, and also requires regeneration monthly or more frequently with potassium permanganate, a somewhat dangerous and expensive chemical.

Another system commercially available uses a pressure tank with a commercially available means of providing air to the pressure tank, a proportioning pump to inject an alkaline material into the water and a sand filter to remove precipitated iron. This system also works, but is cumbersome, requires a delicate pump which can inject too much or too little chemical, requires keeping chemicals around and involves an auxiliary tank and mixing the chemicals with water periodically. Further, the sand filter requires frequent backwashing because it receives gelatinous ferric hydroxide which surface blinds the sand.

Other systems are known in the art such as oxidizing ferrous iron with permanganate, chlorine, hydrogen peroxide, etc., and removing the precipitated ferric hydroxide. Such chemicals are rather dangerous and the systems do not lend themselves to household use. Further, the systems require frequent attention and consume large volumes of water for backwashing. All utilize three or four tanks and require considerable space.

Other objects and advantages of the present invention will be described hereafter and will become apparent to those skilled in this art, the description of the best mode of carrying out the invention being made in connection with the accompanying drawing wherein a water treating system is illustrated in side elevation, the tank being shown in section.

DESCRIPTION

Reference is now made to the drawing wherein the preferred system in accordance with the invention is illustrated. Well water enters through inlet 1 and is passed through an aerating unit 2 comprised of a funnel shaped pipe section having an upstream diameter greater than that of inlet 1, and an air inlet 2a. Air is entrained and mixed by turbulence into the water in a significant quantity, the water sucking air into the aerator device as it moves toward valve 3 to inlet tube 4 where lines 5 and 6 represent low and high water levels in tank 7, as regulated by pressure switch 9 of well-known construction. The latter normally controls well pump operation to maintain between 20 and 40 p.s.i. as indicated by pressure gauge 8. An automatic air release 10 is also provided to permit excess air drawn in through air intake 2, to escape. Thus, the first purification step is achieved in that the vented excess air will carry sulphur containing gases, if any, such as hydrogen sulfide out of the system.

It should be understood, however, that in many cases hydrogen sulfide or other objectionable gases are not present, in which case an excess of air is not needed. Nevertheless, air must be present in the water either from a commercial system or as a result of the novel action of the present system, in order to insure appropriate oxidiation, precipitation and removal of the iron contained in the water. It should be clear that while aeration in the water inlet pipe by an air aspirator device is preferred, air can be conveniently mixed with the water to the extent necessary depending on the impurities involved in the well, or in the tank as by spraying water in the air filled portion of the tank above the mineral bed, in which case air may be introduced into the tank by any suitable means, and the excess air and sulphurous gases, if any, vented thru outlet 10.

Contained in the lower portion of tank 7, is a mineral bed, 13, resting on a coarse gravel bed, 14, the latter being of any suitable inert material. The preferred mineral is a dolomite for reasons explained below, however, calcium carbonate, crushed and sieved, can be used satisfactorily.

In normal operation water enters tank 7, as explained, mixed with air. As water is required, the raw aerated water enters the mineral bed, 13, and slowly passes therethrough. As soon as this raw water enters the mineral, the pH begins to rise and ferric hydroxide begins to form. It is an important element of the invention that this precipitate form at a controlled pace in this single tank system. Rapid formation would result in clogging the upper portion of the mineral without fully utilizing the greater portion of the mineral throughout the thickness of the bed. It is for this reason that dolomite, a mixture of calcium and magnesium carbonates is the preferred material. As soon as the raw water enters the mineral, the pH begins to rise. As the pH rises, the rate of reaction between the oxygen forced into the water at the air jet increases according to the following table.

| Raw water | | Iron in aerated and filtered water | | |
| --- | --- | --- | --- | --- |
| pH | Iron | 15 min. | 30 min. | 60 min. |
| 5.0 | 10.0 | 9.0 | | 7.5 |
| 5.5 | 10.0 | 5.5 | 4.6 | 4.0 |
| 5.95 | 10.0 | 5.0 | 4.0 | 3.5 |
| 6.15 | 10.0 | 4.4 | 3.5 | 2.5 |
| 6.5 | 10.0 | 2.8 | 1.8 | 0.3 |
| 6.8 | 10.0 | 0.2 | 0.1 | 0.1 |
| 7.0 | 10.0 | 0.1 | 0.1 | 0.1 |
| 7.45 | 10.0 | 0.1 | 0.1 | 0.1 |

It is important that the oxidation reaction not occur before the water enters the mineral, otherwise the surface would be blinded and the capacity greatly reduced. Because the reaction occurs relatively slowly, the nature of the ferric hydroxide precipitated is not gelatinous, but is grainy. This is shown in the backwashing operation, where the nature of the removed precipitate can be examined. Because of the grainy nature of this ferric hydroxide, large quantities can be successfully retained within the mineral and long periods between backwashes may be enjoyed.

Below the mineral is a bed of relatively large gravel, 14, of size such that it does not enter the holes in pipe, 15, enroute to the house thru valve 16 at point 17. This serves to prevent the mineral from passing into the pipe 15, and being delivered to the house.

In normal operation valves 3 and 16 are open, while valves 11, 12 and 19 are closed. When the necessity for backwashing arises, valves 3 and 16 are closed and 19 remains closed. Valves 11 and 12 are opened. This permits raw water to enter the coarse gravel bed and pass up thru the mineral. In so doing, the ferric hydroxide separates from the mineral, and being smaller in size and lighter than the mineral, passes to waste thru valve 12 in accordance with Stokes law while the mineral is retained in the tank. In cases where the pump flow is low, it may be necessary to remove the air volume control, 10, and agitate the mineral with a suitable rod or a slug of air may be introduced via valve 19 which accomplishes the same thing.

In addition to serving as a delivery to waste, valve 12 controls the hose bib 18, to be used for outside watering which does not require treated water.

After backwashing is completed, valves 11 and 12 are closed and 3 and 19 are opened. This permits rinsing the system and preparing it to return to normal service. When rinsing is finished valve 19 is closed, 16 is opened and treated water passes to the house at 17. After backwashing, I have found that the mineral regains its initial effectiveness and may be used indefinitely. It is never necessary to change the mineral, but additions may be made if required.

Removal of sulfur odors is accomplished primarily by providing the large excess of air via the air jet 2 which strips the sulfurous gases from the raw water and discharges them to the atmosphere thru outlet 10.

The passage of water thru mineral, 13, removes particulate matter because the particle size and bed depth make an effective mechanical filter. A typical mineral which I have found to be real effective as a mechanical filter has the following sieve analysis:

22% retained on No. 20 U.S. Standard Sieve
22% retained on No. 25 U.S. Standard Sieve
56% retained on No. 50 U.S. Standard Sieve The unit of the invention has no possibility of endangering the consumer. Further, no permanganate or alkali chemicals are requried, it never requires regeneration of treating mineral, only occasional backwashing, no chemicals need be kept at home and never does the home owner have to dissolve a chemical in a certain volume of water for injection into the system.

Mechanically, there is very little to cause trouble, and the unit functions normally between backwashes with no attention from the home owner whatsoever. Should anything happen to the system, such as loss of pressure due to loss of electric power, nothing need be done upon return of the electricity. The system is self correcting. If a mistake is made and a valve is opened or closed in error, returning the valve to normal results in no more distress than a possible momentary cloudiness to the water to the house.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A process or treating well water for purification thereof to improve palatability, remove iron and reduce aggressiveness due to the acidity of the water, comprising the steps of conducting impure water from a well, introducing and mixing a substantial amount of air in said water, the amount of air being insufficient to substantially precipitate the iron from the water or to raise the pH of the water to an alkaline level, venting excess air from said air and water so mixed while containing the same, and thereafter gradually raising the pH of the water to 7.0–7.5 while filtering iron hydroxide and other impurities therefrom by passing air and water so mixed while so contained directly through a mineral bed comprised of a mineral capable of raising the pH to 7.0–7.5 and being of particulate size sufficient to filter iron hydroxide and other solid impurities precipitated therefrom during said raising of the pH.

2. A process as defined in claim 1 wherein the pH of said water is adjusted by passing it thru a particulate bed of dolomite.

3. A process as defined in claim 2 wherein said gradually formed iron hydroxide is such that it achieves a grainy physical characteristic.

4. A unitary water treating apparatus adopted to remove normal impurities comprising bad taste and odor, iron and aggressiveness due to acidity from well water consisting essentially of a single water tank containing a mineral filter bed in the lower portion thereof, means for conducting water from a well into said tank above and adjacent to said mineral bed, means for mixing air with said water in an amount insufficient to substantially oxidize and precipitate the iron from the water or to raise the pH of the water to an alkaline level prior to passage thru said mineral bed, and withdrawal conduit means located in the lower portion of said tank beneath at least a substantial part of said mineral bed for withdrawing water from said tank, said mineral bed being comprised of a mineral capable of raising the pH of said water as it is passed therethrough to 7.0–7.5 and being of particulate size sufficient to filter iron hydroxide and other solid impurities precipitated therefrom during said raising of the pH.

5. Apparatus as defined in claim 4, wherein said means for mixing air with said water is a device located in said water conducting means, and said tank is further provided with means for venting excess air and any entrained gases prior to passage of said water thru said mineral bed.

6. Apparatus as defined in claim 4, wherein said mineral is dolomite.

7. Apparatus as defined in claim 4, wherein said mineral is calcium carbonate.

8. Apparatus as defined in claim 5, wherein said mineral is dolomite.

References Cited

UNITED STATES PATENTS

| | | | |
|---|---|---|---|
| 2,352,901 | 7/1944 | Klein | 210—151 X |
| 1,997,114 | 4/1935 | Martin | 210—53 |
| 2,237,882 | 4/1941 | Lawlor et al. | 210—50 |

MICHAEL ROGERS, Primary Examiner

U.S. Cl. X.R.

210—50, 151, 205